United States Patent
Hong et al.

(10) Patent No.: US 7,647,068 B2
(45) Date of Patent: Jan. 12, 2010

(54) APPARATUS FOR CONTROLLING BOOTING OF MOBILE TERMINAL AND METHOD THEREOF

(75) Inventors: Do-Keun Hong, Gunpo (KR); Jin-Sub Hong, Gwangmyeong (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 11/383,815

(22) Filed: May 17, 2006

(65) Prior Publication Data

US 2006/0264248 A1 Nov. 23, 2006

(30) Foreign Application Priority Data

May 20, 2005 (KR) .................. 10-2005-0042694

(51) Int. Cl.
*H04M 1/00* (2006.01)
(52) U.S. Cl. .............. 455/550.1; 455/572; 455/571; 307/130; 307/125
(58) Field of Classification Search ............ 455/550.1, 455/572, 571; 307/130, 125
See application file for complete search history.

(56) References Cited

U.S. PATENT DOCUMENTS

| | | | | |
|---|---|---|---|---|
| 5,706,356 A * | 1/1998 | Walden | ............. | 381/106 |
| 5,959,371 A * | 9/1999 | Dooley et al. | ............. | 307/130 |
| 7,265,518 B2 * | 9/2007 | Lee et al. | ............. | 320/134 |
| 2006/0101294 A1 * | 5/2006 | Lee et al. | ............. | 713/300 |
| 2007/0002661 A1 * | 1/2007 | Chu et al. | ............. | 365/226 |

FOREIGN PATENT DOCUMENTS

| CN | 2569417 | 8/2003 |
|---|---|---|
| KR | 10-2004 0066664 | 7/2004 |

OTHER PUBLICATIONS

English language Abstract of Korea 10-2004-0066664.
English language Abstract of CN 2569417, Aug. 27, 2003.

* cited by examiner

*Primary Examiner*—Danh C Le
(74) *Attorney, Agent, or Firm*—Birch, Stewart, Kolasch & Birch, LLP

(57) ABSTRACT

A mobile terminal which includes a voltage comparing unit that compares a battery voltage to a reference voltage, and a controller that controls a booting operation of the mobile terminal according to the comparison.

31 Claims, 3 Drawing Sheets

FIG. 2
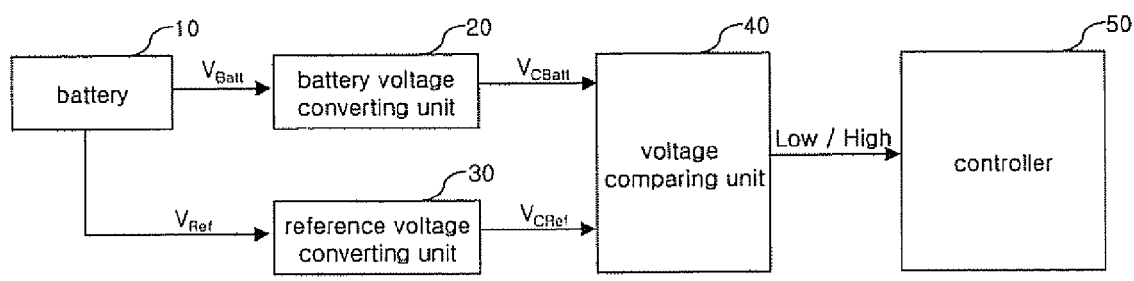
FIG. 3A                    FIG. 3B
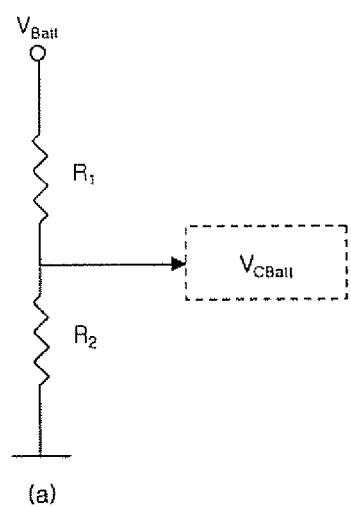    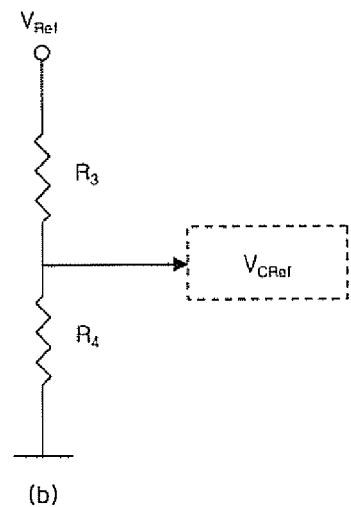
(a)                        (b)

APPARATUS FOR CONTROLLING BOOTING OF MOBILE TERMINAL AND METHOD THEREOF

This application claims the benefit of Korean Application No. 10-2005-0042694, filed on May 20, 2005, which is hereby incorporated by reference in its entirety.

BACKGROUND OF THE INVENTION

1. Field of the Invention

The present invention relates to mobile terminals, and more particularly, to an apparatus for controlling a booting of a mobile terminal which is capable of preventing the mobile terminal from performing an unstable operation due to a malfunctional booting operation, and a method thereof.

2. Background of the Invention

Generally, a mobile terminal which relies on a battery for power monitors the voltage level of the battery. Examples of such a mobile terminal include, but are not limited to, a mobile phone, a PDA, a laptop computer, a portable music player, a portable game device, a camera, or a camcorder. When the mobile terminal determines that the battery has reached a low battery state, the mobile terminal automatically shuts off.

For example, a mobile terminal may utilize a battery which has a voltage level of 4.2 V when fully charged. The mobile terminal may be configured to automatically shut off if the voltage level of the battery drops to 3.2 V or below, for example.

If a user attempts to turn the mobile terminal back on after it has been shut down due to a low battery, the mobile terminal begins to supply power to each of the components of the mobile terminal. This is typically performed under the control of a power management integrated circuit (PMIC), and is performed only if the battery has enough charge to supply an operating voltage to the PMIC. For example, if the mobile terminal shuts off when its battery voltage level drops to 3.2 V or below, and the operating voltage of the PMIC is 2.6 V, when a user turns the mobile terminal back on the PMIC will begin supplying power to the components of the mobile terminal if the battery voltage level of the mobile terminal is at least 2.6 V.

However, the mobile terminal remains powered on only momentarily. Since the mobile terminal is unable to determine the voltage of the battery until all of its components are in operation, it cannot immediately determine that there is a low battery state which requires the mobile terminal to shut-off. Accordingly, the mobile terminal may perform unstable operations, such as repetitively turning a display on and off, or unexpectedly resetting.

SUMMARY OF THE INVENTION

In view of the foregoing, the present invention, through one or more of its various aspects, embodiments, and/or specific features or sub-components, is thus intended to bring out one or more of the advantages as specifically noted below.

An object of the present invention is to prevent a mobile terminal from booting when it is in a low battery state.

To achieve at least this object, there is provided a mobile terminal which includes a voltage comparing unit that compares a battery voltage to a reference voltage, and a controller that controls a booting operation of the mobile terminal according to the comparison.

The mobile terminal may include a battery voltage converter that converts a battery voltage to a converted battery voltage, where the voltage comparing unit compares the converted battery voltage to the reference voltage. The converted battery voltage may fall within an operating range of an input terminal of the voltage comparing unit. The converted battery voltage may be set to a value within a predetermined level for comparing the battery voltage to the reference voltage. The battery voltage converter may include a voltage divider circuit. The voltage divider circuit may output the converted battery voltage.

The mobile terminal may include a reference voltage converter that converts a reference voltage to a converted reference voltage, where the voltage comparing unit compares the battery voltage to the converted reference voltage. The converted reference voltage may fall within an operating range of an input terminal of the voltage comparing unit. The converted reference voltage may be set to a value within a predetermined level for comparing the reference voltage to the battery voltage. The reference voltage converter may include a voltage divider circuit. The voltage divider circuit may output the converted reference voltage.

The reference voltage may correspond to a minimum voltage required for operating essential components of the mobile terminal. The voltage comparing unit may send a signal for controlling the mobile terminal to the controller according to the comparison. The voltage comparing unit may send a signal for booting the mobile terminal to the controller when the battery voltage is greater than or equal to the reference voltage. The controller may boot the mobile terminal when it receives the signal for booting the mobile terminal. The controller may boot the mobile terminal when the battery voltage is greater than or equal to the reference voltage.

The voltage comparing unit may send a signal for preventing booting of the mobile terminal to the controller when the battery voltage is lower than the reference voltage. The controller may determine not to boot the mobile terminal when it receives the signal for preventing booting of the mobile terminal. The controller may not boot the mobile terminal when the battery voltage is lower than the reference voltage. The controller may convey an announcement to a user when the battery voltage is lower than the reference voltage.

There is also provided a method for controlling a booting of a mobile terminal which includes comparing a battery voltage to a reference voltage, and controlling a booting of the mobile terminal according to the comparison.

The method may include converting a battery voltage to a converted battery voltage, where the battery voltage which is compared to the reference voltage is the converted battery voltage. The converted battery voltage may fall within an operating range of an input terminal of a voltage comparing unit. The converted battery voltage may be set to a value within a predetermined level for comparing the battery voltage to the reference voltage.

The method may include converting a reference voltage to a converted reference voltage, where the reference voltage which is compared to the battery voltage is the converted reference voltage. The converted reference voltage may fall within an operating range of an input terminal of a voltage comparing unit. The converted reference voltage may be set to a value within a predetermined level for comparing the reference voltage to the battery voltage.

The reference voltage may correspond to a minimum voltage required for operating essential components of the mobile terminal. The comparison may include comparing the size of the battery voltage to that of the reference voltage. The method may include sending a signal for controlling the mobile terminal to a controller according to the comparison. The method may include sending a signal for booting the terminal to a controller when the battery voltage is greater than or equal to or the reference voltage. The method may include booting the mobile terminal when the signal for booting the terminal is received by the controller. The method may include booting the mobile terminal when the battery voltage is greater than or equal to the reference voltage.

The method may include sending a signal for preventing booting of the mobile terminal to a controller when the battery voltage is lower than the reference voltage. The controller may determine not to boot the mobile terminal when it receives the signal for preventing booting of the mobile terminal. The method may include preventing booting of the mobile terminal when the battery voltage is lower than the reference voltage. The method may include conveying an announcement to a user when the battery voltage is lower than the reference voltage.

There is also provided a mobile terminal which includes a battery voltage converter that generates an output voltage based on a battery voltage when the mobile terminal is powered on, a reference voltage converter that generates a reference voltage based on a voltage required for operating the mobile terminal, a voltage comparator that compares the output voltage and the reference voltage, and a processor that determines whether to prevent the mobile terminal from booting based upon the comparison.

The output voltage may fall within an operating range of an input terminal of the voltage comparator. The output voltage may be set to a value within a predetermined level for comparing the output voltage with the reference voltage. The reference voltage may fail within an operating range of an input terminal of the voltage comparator. The reference voltage may be set to a value within a predetermined level for comparing the reference voltage with the output voltage.

The battery voltage converter and the reference voltage converter may include a voltage divider circuit. The reference voltage may correspond to a minimum voltage required for operating the mobile terminal. The voltage comparator may send a signal for booting the mobile terminal to the processor when the output value is greater than or equal to the reference voltage. The processor may boot the mobile terminal when the output voltage is greater than or equal to the reference voltage.

The voltage comparator may send a signal for preventing booting of the mobile terminal to the processor when the output voltage is lower than the reference voltage. The processor may prevent booting of the mobile terminal when the output voltage is lower than the reference voltage. The processor may inform a user that the mobile terminal will not be booted and shut off the mobile terminal if the output voltage is lower than the reference voltage.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 2 illustrates an embodiment of a booting controller for a mobile terminal in accordance with another aspect of the present invention;

FIGS. 3A and 3B illustrate embodiments of a battery voltage converting unit and a reference voltage converting unit in accordance with one aspect of the present invention.

DETAILED DESCRIPTION OF THE INVENTION

Described below is an apparatus which prevents a mobile terminal from booting when it is in a low battery state, and thus prevents malfunctions and unnecessary re-booting. The apparatus compares a battery voltage to a reference voltage when a user attempts to power on the mobile terminal, and if it determines that the mobile terminal is in a low battery state, it conveys an announcement to a user, and prevents the mobile terminal from booting.

Figure 1:
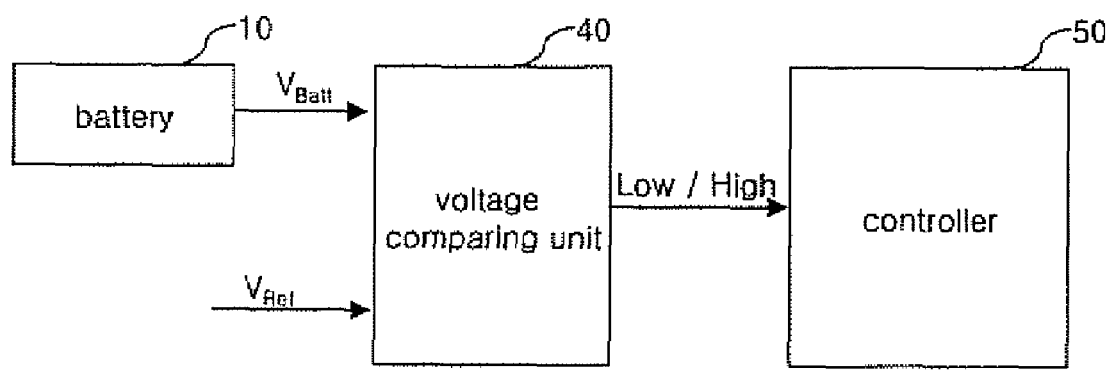
FIG. 1 illustrates a booting controller for a mobile terminal in accordance with one aspect of the present invention.

FIG. 1 illustrates a booting controller for a mobile terminal. Examples of such a mobile terminal include, but are not limited to, a mobile phone, a PDA, a laptop computer, a portable music player, a portable game device, a camera, or a camcorder. As shown in FIG. 1, a voltage comparing unit 40 reads a battery voltage $V_{Batt}$ from a battery 10 of the mobile terminal and compares the battery voltage $V_{Batt}$ to a reference voltage $V_{Ref}$. Based on the comparison, the voltage comparing unit 40 outputs a state level signal to a controller 50, which controls the booting of the mobile terminal depending on the value of the state level signal. The controller 50 may be implemented, for example, by a processor.

An operation of the booting controller is explained below with reference to FIG. 1.

When a user attempts to turn the mobile terminal on (such as pressing a power-on button) the battery voltage $V_{Batt}$ and the reference voltage $V_{Ref}$ are provided to the voltage comparing unit 40. In one embodiment, the reference voltage $V_{Ref}$ may be stored and retrieved from a memory of the mobile terminal. In one embodiment, the reference voltage $V_{Ref}$ may correspond to the minimum voltage required for operating essential components of the mobile terminal, such as the controller 50. For example, in this embodiment, if the operating voltage for the controller 50 is 2.65 V, the reference voltage $V_{Ref}$ would be 2.65 V.

The voltage comparing unit 40 compares the battery voltage $V_{Batt}$ to the reference voltage $V_{Ref}$ and outputs a high or a low level signal, based on the comparison, to indicate whether the mobile terminal is in a low battery state. For example, if the battery voltage $V_{Batt}$ is higher than the reference voltage $V_{Ref}$, the voltage comparing unit 40 outputs a high signal to the controller 50, and if the battery voltage $V_{Batt}$ is lower than the reference voltage $V_{Ref}$, the voltage comparing unit 40 outputs a low signal to the controller 50. In one exemplary embodiment, the voltage comparing unit 40 is implemented with an operational amplifier. However, the voltage comparing unit may alternately be implemented with application specific integrated circuits, programmable logic arrays and other hardware devices. In another exemplary embodiment, the voltage comparing unit 40 outputs the state level signal to a general purpose I/O port of the controller 50.

If the state level signal received by the controller 50 is a high signal, the controller 50 initiates and controls booting of the mobile terminal. However, if the state level signal is a low signal, the controller 50 does not boot the mobile terminal. Instead, the controller 50 controls the mobile terminal to convey an announcement to the user that the mobile terminal cannot be booted, such as by displaying a message on the mobile terminal. The mobile terminal then shuts off.

FIG. 2 illustrates another embodiment of the booting controller. In this embodiment, a battery voltage converting unit 20 converts a battery voltage $V_{Batt}$ to a converted battery voltage $V_{CBatt}$, and a reference voltage converting unit 30 converts a reference voltage $V_{Ref}$ to a converted reference voltage $V_{CRef}$. In this embodiment, the voltage comparing unit 40 compares the converted battery voltage $V_{CBatt}$ and the converted reference voltage $V_{CRef}$, rather than the battery voltage $V_{Batt}$ and the reference voltage $V_{Ref}$. The battery voltage converting unit 20 and the reference voltage converting unit 30 function to convert the battery voltage $V_{Batt}$ and the reference voltage $V_{Ref}$ to voltages which fall within the operating range of the input terminals of the voltage comparing unit 40. Of course, the present invention also encompasses embodiments in which only a battery voltage converting unit 20 or only a reference voltage converting unit 30 are utilized.

FIG. 3 illustrates embodiments of a battery voltage converting unit and a reference voltage converting unit.

In the embodiments illustrated in FIGS. 3A and 3B, the battery voltage converting unit 20 and the reference voltage converting unit 30 are implemented by voltage divider circuits. The battery voltage converting unit 20 illustrated in FIG. 3A includes a resistor $R_1$ and a resistor $R_2$, whose resistance values are flexibly chosen to obtain the desired $V_{Batt}$ to $V_{CBatt}$ ratio. Similarly, the reference voltage converting unit 30 illustrated in FIG. 3B includes a resistor $R_3$ and a resistor $R_4$, whose resistance values are flexibly chosen to obtain the desired $V_{Ref}$ to $V_{CRef}$ ratio.

Figure 4:
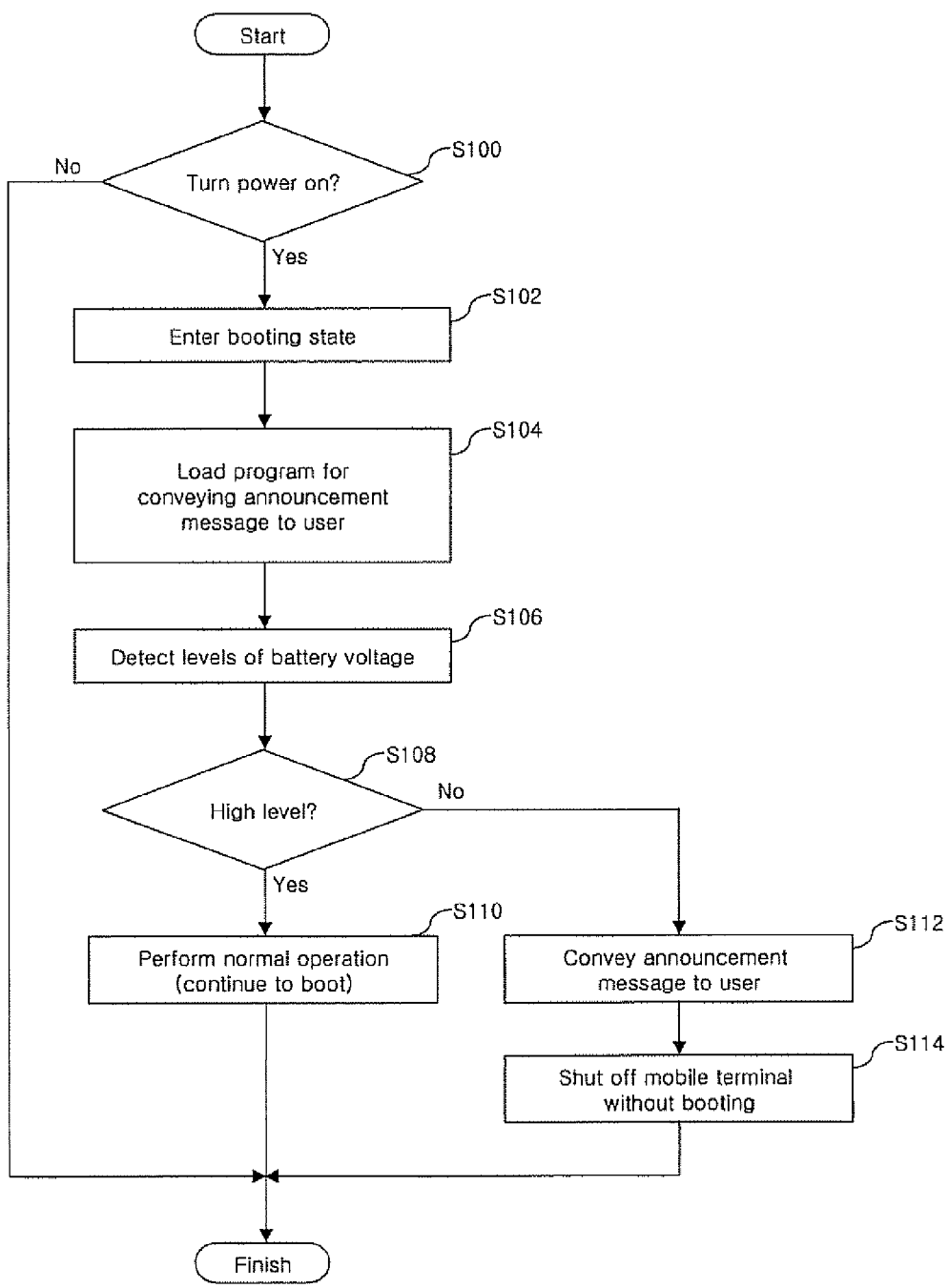
FIG. 4 illustrates a method for controlling the booting of a mobile terminal in accordance with one aspect of the present invention.

FIG. 4 illustrates a method for controlling the booting of a mobile terminal.

When a user attempts to power on the mobile terminal (such as by pressing a power-on button) the mobile terminal enters into a booting state (S100 and S102). In some embodiments, this state may include a process of loading an operation program stored in a non-volatile memory (such as, but not limited to, a NAND flash memory) into other internal and/or external memory of the mobile terminal (such as, but not limited to, a static random access memory or synchronous dynamic random access memory). The mobile terminal then loads a program into the controller 50 which includes instructions for conveying an announcement to a user and preventing the mobile terminal from booting when the mobile terminal is in a low battery state (S104). Of course, the order in which the operation program and the program for conveying the announcement are loaded may be reversed.

The voltage comparing unit 40 then reads a battery voltage $V_{Batt}$ from the battery 10 of the mobile terminal and compares the battery voltage $V_{Batt}$ to the reference voltage $V_{Ref}$ (S106). Of course, if the mobile terminal utilizes a battery voltage converting unit 20 and/or a reference voltage converting unit 30, the voltage converting unit 20 first converts the battery voltage $V_{Batt}$ to a converted battery voltage $V_{CBatt}$, and/or the reference voltage converting unit 30 first converts the reference voltage $V_{Ref}$ to a converted reference voltage $V_{CRef}$. In this embodiment, the voltage comparing unit 40 compares the converted battery voltage $V_{CBatt}$ and the converted reference voltage $V_{CRef}$, rather than the battery voltage $V_{Batt}$ and the reference voltage $V_{Ref}$.

Based on the comparison, the voltage comparing unit 40 sends a state level signal to the controller 50 (S108). If the state level signal is a high signal (i.e., if the battery voltage $V_{Batt}$ is greater than or equal to the reference voltage $V_{Ref}$), the controller 50 performs a normal booting operation (S110).

However, if the state level signal is a low signal (i.e., if the battery voltage $V_{Batt}$ is lower than the reference voltage $V_{Ref}$), the controller 50 conveys an announcement to the user that the mobile terminal cannot be booted (S112), and shuts off the mobile terminal without booting (S114).

The apparatus described above prevents the mobile terminal from booting when it is in a low battery state, and thus prevents malfunctions and unnecessary re-booting. The apparatus compares a battery voltage to a reference voltage when a user attempts to power on the mobile terminal, and if it determines that the mobile terminal is in a low battery state, it conveys an announcement to a user, and prevents the mobile terminal from booting.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

Dedicated hardware implementations, such as application specific integrated circuits, programmable logic arrays and other hardware devices, can be constructed to implement one or more of the methods described above. The methods described above may also be implemented by software programs executable by processors.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above-described embodiments are not limited by any of the details of the foregoing description, unless otherwise specified. Rather, the above-described embodiments should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A mobile terminal, comprising:
    a battery configured to provide power to the mobile terminal;
    a controller configured to receive a power on input signal requesting the mobile terminal be powered on from a power off state, to power on the mobile terminal using a battery voltage from the battery in response to the power on input signal, to execute a booting operation providing power to components included in the mobile terminal, and to detect the battery voltage provided to the mobile terminal;
    a battery voltage converter configured to convert the battery voltage to a converted battery voltage;
    a reference voltage converter configured to convert a predetermined reference voltage to a converted reference voltage; and
    a voltage comparing unit configured to compare the converted battery voltage to the converted reference voltage, said converted reference voltage falling within an operating range of an input terminal of the voltage comparing unit,
    wherein the controller is further configured to power off the mobile terminal without re-performing the booting operation of the mobile terminal when the voltage comparing unit determines the converted battery voltage is less than the converted reference voltage.

2. The terminal according to claim 1, wherein the converted battery voltage falls within the operating range of the input terminal of the voltage comparing unit.

3. The terminal according to claim 1, wherein the converted battery voltage is set to a value within a predetermined level for comparing the battery voltage to the converted reference voltage.

4. The terminal according to claim 1, wherein the battery voltage converter comprises a voltage divider circuit.

5. The terminal according to claim 4, wherein the voltage divider circuit is configured to output the converted battery voltage.

6. The terminal according to claim 1, wherein the converted reference voltage is set to a value within a predetermined level for comparing the reference voltage to the battery voltage.

7. The terminal according to claim 1, wherein the reference voltage converter comprises a voltage divider circuit.

8. The terminal according to claim 7, wherein the voltage divider circuit is further configured to output the converted reference voltage.

9. The terminal according to claim 1, wherein the converted reference voltage corresponds to a minimum voltage required for operating essential components of the mobile terminal.

10. The terminal according to claim 1, wherein the voltage comparing unit is further configured to send a signal for controlling the mobile terminal to the controller according to the comparison.

11. The terminal according to claim 1, wherein the voltage comparing unit is further configured to send a signal for performing the booting operation of the mobile terminal to the controller when the voltage comparing unit determines the converted battery voltage is greater than or equal to the converted reference voltage.

12. The terminal according to claim 1, wherein the controller is further configured to continue performing the booting operation of the mobile terminal when the voltage comparing unit determines the converted battery voltage is greater than or equal to the converted reference voltage.

13. The terminal according to claim 1, wherein the controller is further configured to output an announcement to a user when the converted battery voltage is lower than the converted reference voltage.

14. The terminal according to claim 13, wherein the controller is further configured to load a program for outputting the announcement before the voltage comparing unit compares the converted battery voltage to the converted reference voltage.

15. The terminal according to claim 1, wherein the mobile terminal includes one of a mobile phone, a personal digital assistant, a laptop computer, a portable music player, a portable game device, a camera and a camcorder.

16. The terminal according to claim 1, wherein the battery voltage converter unit is connected directly between the battery and the voltage comparing unit, the reference voltage converter is connected directly between the battery and the voltage comparing unit, and the voltage comparing unit is connected directly to the controller.

17. A method of controlling a mobile terminal, the method comprising:
    receiving, via a controller, a power on input signal requesting the mobile terminal be powered on from a power off state;
    powering on the mobile terminal using a battery voltage from a battery, via the controller, in response to the power on input signal;
    executing, via the controller, a booting operation providing power to components included in the mobile terminal;
    detecting, via the controller, the battery voltage provided to the mobile terminal;
    converting, via a battery voltage converter, the battery voltage to a converted battery voltage;
    converting, via a predetermined reference voltage converter, a reference voltage to a converted reference voltage;
    comparing, via a voltage comparing unit, the converted battery voltage to the converted reference voltage, said converted reference voltage falling within an operating range of an input terminal of the voltage comparing unit; and
    powering off the mobile terminal, via the controller, without re-performing the booting operation of the mobile terminal when the converted battery voltage is less than the converted reference voltage.

18. The method according to claim 17, wherein the converted battery voltage falls within the operating range of the input terminal of the voltage comparing unit.

19. The method according to claim 17, wherein the converted battery voltage is set to a value within a predetermined level for comparing the battery voltage to the converted reference voltage.

20. The method according to claim 17, wherein the battery voltage converter comprises a voltage divider circuit.

21. The method according to claim 20, wherein the voltage divider circuit is configured to output the converted battery voltage.

22. The method according to claim 17, wherein the converted reference voltage is set to a value within a predetermined level for comparing the reference voltage to the battery voltage.

23. The method according to claim 20, further comprising:
outputting, from the voltage divider circuit, the converted reference voltage.

24. The method according to claim 17, wherein the converted reference voltage corresponds to a minimum voltage required for operating essential components of the mobile terminal.

25. The method according to claim 17, further comprising;
sending, from the voltage comparing unit, a signal for controlling the mobile terminal to the controller according to the comparing step.

26. The method according to claim 17, further comprising:

sending, from the voltage comparing unit, a signal for performing the booting operation of the mobile terminal to the controller when the comparing step determines the converted battery voltage is greater than or equal to the converted reference voltage.

27. The method according to claim 17, further comprising:
continuing to perform the booting operation of the mobile terminal when the comparing step determines the converted battery voltage is greater than or equal to the converted reference voltage.

28. The method according to claim 17, further comprising:
outputting an announcement to a user when the converted battery voltage is lower than the converted reference voltage.

29. The method according to claim 28, further comprising:
loading a program for outputting the announcement before the comparing step compares the converted battery voltage to the converted reference voltage.

30. The method according to claim 17, wherein the mobile terminal includes one of a mobile phone, a personal digital assistant, a laptop computer, a portable music player, a portable game device, a camera and a camcorder.

31. The method according to claim 17, wherein the battery voltage converter is connected directly between the battery and the voltage comparing unit, the reference voltage converter is connected directly between the battery and the voltage comparing unit, and the voltage comparing unit is connected directly to the controller.

* * * * *